(12) United States Patent
Taylor et al.

(10) Patent No.: US 6,948,715 B2
(45) Date of Patent: Sep. 27, 2005

(54) SEAL ASSEMBLY WITH ACCUMULATOR RING

(75) Inventors: William M. Taylor, Houston, TX (US); Gerald S. Baker, Houston, TX (US); Larry E. McDonald, Hempstead, TX (US)

(73) Assignee: Cooper Cameron Corporation, Houston, TX (US)

( * ) Notice: Subject to any disclaimer, the term of this patent is extended or adjusted under 35 U.S.C. 154(b) by 25 days.

(21) Appl. No.: 10/207,310

(22) Filed: Jul. 29, 2002

(65) Prior Publication Data

US 2004/0017047 A1 Jan. 29, 2004

(51) Int. Cl.⁷ ............... F16L 21/05; F16L 5/02; E21B 33/127
(52) U.S. Cl. ............ 277/603; 277/605; 277/608; 277/331
(58) Field of Search ............... 277/322–325, 277/327, 333, 344, 337–338, 602–605, 606–609, 619, 626, 627, 628, 630, 634, 645, 650

(56) References Cited

U.S. PATENT DOCUMENTS

| | | | |
|---|---|---|---|
| 2,483,827 A | | 10/1949 | Guiler |
| 2,848,412 A | * | 8/1958 | Walker ................ 204/674 |
| 3,147,015 A | * | 9/1964 | Hanback .............. 277/626 |
| 3,273,900 A | * | 9/1966 | Street .................. 277/323 |
| 3,313,553 A | * | 4/1967 | Gastineau ............ 277/605 |
| 4,178,020 A | * | 12/1979 | Dopyera ............... 285/18 |
| 4,496,162 A | | 1/1985 | McEver et al. |
| 4,553,759 A | * | 11/1985 | Kilmoyer ............. 251/214 |
| 4,900,039 A | | 2/1990 | Klecker et al. |
| 4,915,397 A | * | 4/1990 | Nicholson ............ 277/647 |
| 5,114,158 A | * | 5/1992 | Le ........................ 277/314 |
| 5,135,238 A | | 8/1992 | Wells et al. |
| 5,197,807 A | | 3/1993 | Kuznar |
| 5,224,715 A | * | 7/1993 | Downes et al. ...... 277/322 |
| 5,280,924 A | | 1/1994 | Burgess |
| 5,339,861 A | | 8/1994 | Smith, III |
| 5,662,341 A | | 9/1997 | Ezell et al. |
| 5,984,313 A | | 11/1999 | Kraus |
| 6,279,875 B1 | | 8/2001 | Chatufale |
| 6,302,402 B1 | | 10/2001 | Rynders et al. |
| 6,322,079 B1 | | 11/2001 | Mullaney, III |
| 6,325,380 B1 | | 12/2001 | Feigl et al. |
| 6,557,858 B1 | * | 5/2003 | Carr et al. ........... 277/644 |

* cited by examiner

Primary Examiner—Alison Pickard
Assistant Examiner—Vishal Patel
(74) Attorney, Agent, or Firm—A. M. (Andy) Arismendi; Michael P. Hartmann; Peter Bielinski (57) ABSTRACT

A seal assembly with an accumulator ring for protecting a seal from explosive decompression is disclosed. The accumulator ring and the seal are contained within a seal gland. The seal is made of a material that is susceptible to damage from explosive decompression. When exposed to a high-pressure fluid environment, the accumulator ring fills with a quantity of high-pressure fluid, either by permeation if it is solid or by permeation and/or vents and/or channels leading to a void if it is hollow. During an explosive decompression event, the accumulator ring expands to fill the remaining volume of the seal gland. Then, the accumulator ring exerts an axial compressive or supporting force on the seal for a sufficient amount of time to allow the seal to expel fluid contained in it and minimize the effects of explosive decompression thereto.

31 Claims, 9 Drawing Sheets

SEAL ASSEMBLY WITH ACCUMULATOR RING

BACKGROUND OF THE INVENTION

1. Field of the Invention

The present invention relates to a seal assembly and method of sealing for use in high pressure application, for example, drilling and production applications. More particularly, the invention involves a seal assembly and method of sealing the junction between the male and female members or face seal members, wherein the seals are susceptible to explosive decompression effects.

2. Related Art

Ring seals are used in a variety of environments. Of particular interest are ring seals used in high-pressure environments. These include applications such as oil field drilling and production operations, hydraulic couplings, blowout preventer packings, etc.

Typical ring seals are often made from semi-permeable elastomeric materials. The sealing rings are intended to seal against a particular medium; if the pressure brought against the sealing rings by the medium becomes too great, the medium begins to penetrate the elastomeric material that constitutes the sealing rings. If a sudden pressure drop occurs in the surroundings of the sealing ring after such a penetration has occurred, the medium that has penetrated into the sealing rings abruptly expands. As a consequence of this expansion, the sealing rings are damaged or even destroyed. This kind of event is called an "explosive decompression." This is a particular problem when the fluid is a gas at high temperature and pressure. In order to reduce the risk of an explosive decompression occurring, it is known to use seals, for example, o-rings, having a reduced cross-section and, as a result, a reduced exposed surface area. The likelihood of explosive decompression is also decreased by using seals made of materials having very low or very high permeability rates, such as costly and weaker silicone materials. Low permeability rates minimizes the incorporation of fluid in such materials, typically having a high durometer, thereby minimizing the effects of explosive decompression thereto. High permeability rates allows any fluid within such a material to be quickly released, thereby minimizes such effects thereto. Additionally, seal designers attempt to achieve a maximum volume fill of the seal gland partly to try to minimize such effects, but are constrained from doing so due to the thermal coefficient of expansion of the materials placed within the seal gland. Thus, a 100% volume fill cannot be accomplished. At best, about a 90% volume fill is attainable at room temperature.

There is a need to protect ring seals and provide a degree of resistance to explosive decompression regardless of the material that constitutes the ring seals.

SUMMARY OF THE INVENTION

In a broad aspect, there is provided a seal assembly for high pressure applications, said assembly comprising:

a first member having a first surface;

a second member having a second surface, wherein the first surface and second surface oppose and are spaced from each other when the first and second members are joined;

a third surface and a fourth surface, wherein each of the third and fourth surfaces is integral to, attached to or supported by one of the first and second surfaces and wherein the third surface and fourth surface oppose and are spaced from each other, wherein the first, second, third and fourth surfaces define a seal gland therewithin;

a ring seal positioned within the seal gland, wherein the ring seal being axially compressible to sealingly engage the first surface and the second surface and the ring seal is susceptible to explosive decompression effects; and an accumulator ring positioned within the seal gland on the side of the ring seal to be exposed to a high pressure fluid, wherein said accumulator ring has an exterior and an interior, wherein the interior has a void fraction defining an accumulator volume and said accumulator ring has at least one channel providing communication between the exterior of the accumulator ring and the accumulator volume, wherein in an installed position exposed to high pressure fluids, the accumulator volume fills with fluid and during an explosive decompression event, the at least one channel allows the fluid in the accumulator ring to escape at a rate sufficient to allow the exterior to compress the ring seal for a sufficient amount of time to minimize the explosive decompression effects on the ring seal.

In one embodiment, the first member is a female member and the second member is a male member. In this embodiment, the seal assembly comprises:

a female member having a longitudinal bore and an annular shoulder in the bore;

a male member insertable into the female member bore, having an annular shoulder on the outer surface thereof, wherein the male and female members are joined and define a seal gland between the shoulders thereof;

a ring seal positioned within the seal gland, wherein the ring seal is axially compressible to sealingly engage the male member and the female member bore and the ring seal is susceptible to explosive decompression effects; and an accumulator ring positioned within the seal gland on the side of the ring seal to be exposed to a high pressure fluid, wherein said accumulator ring has an exterior and an interior, wherein the interior has a void fraction defining an accumulator volume and the accumulator ring has at least one channel providing communication between the exterior of the accumulator ring and the accumulator volume, wherein in an installed position exposed to high pressure fluids, the accumulator volume fills with fluid and during an explosive decompression event, the at least one channel allows the fluid in the accumulator ring to escape at a rate sufficient to allow the exterior of the accumulator ring to compress the ring seal for a sufficient amount of time to minimize the explosive decompression effects on the ring seal. This active support of the seal during pressure venting provided by the accumulator ring simulates a 100% volume fill design (or zero void fraction) of the seal gland.

In one embodiment, the accumulator ring and the ring seal fill the seal gland in an installed position.

In an alternate embodiment, a seal retainer is placed in the seal gland. The seal retainer has a first end and a second end. The first end is configured to contact the annular shoulder of the male member and the second end configured to contact the ring seal to compress the ring seal axially. A locking means may be added to limit axial movement of the seal retainer. The locking means may, for example, be a clip engageable with the female member bore to hold the retainer in the bore.

In one embodiment, the accumulator ring is an o-ring made of a flexible but relatively strong and preferably semi-resilient material, for example, metal and plastics (such as Kevlar), where the o-ring is provided with at least one vent hole between the exterior and interior of the o-ring. The o-ring is pressure-energized to engage the ring seal and the shoulder abutting accumulator ring in response to an explosive decompression event in the seal assembly, thereby supporting the seal. After the pressure venting process has terminated or during any application of pressure that has equalized, the accumulator ring, being made of a strong yet resilient material, eventually restores itself to its original shape.

In another embodiment, the accumulator ring is made of a material permeable by the high-pressure fluid. In this case, the extent of permeation of the high-pressure fluid is the void fraction. The material releases the permeated fluid therefrom during an explosive decompression event at a slower rate than the ring seal. This allows the accumulator ring to expand and place an axial compressive load the ring seal within the seal gland to minimize the explosive decompression effects on the ring seal. The accumulator ring may also be partly hollow providing an additional volume for containing the high-pressure fluid that has permeated through the material and thus increases the void fraction. In either configuration, when the rate of pressure change is near zero, the accumulator ring will eventually restore itself to its original shape.

In another embodiment, the accumulator ring has at least a first toroidal ring and a second toroidal ring. Each of the first and second toroidal rings has an axial cross section that defines a planar figure. The planar figure partially encloses an area having an open side and a closed side. The open side of the first toroidal ring is placed within the open side of the second toroidal ring with the closed sides of the first and second toroidal rings opposing each other. The thus positioned first and second toroidal rings define an enclosed volume therewithin and an exterior surface.

The planar figure formed by the axial cross section of the first and second toroidal rings is preferably U-shaped. Therefore, the first and second toroidal rings are each a U-shaped toroidal ring having an open side and a closed side.

Preferably, at least one of the first and second toroidal rings has at least one vent to allow high-pressure fluid to enter or exit the enclosed volume. During an explosive decompression event, the fluid in the enclosed volume expands and exits through the at least one vent. The number and size of the vent(s) controls the exit flow rate of the fluid and allows the expanding fluid remaining within the enclosed volume to urge the first and second toroidal rings to expand radially against each other and the male member. The first and second toroidal rings are also urged apart axially against the ring seal and the shoulder abutting the accumulator ring to axially compress or support the ring seal for a sufficient amount of time during an explosive decompression event to minimize the explosive decompression effects on the ring seal.

Alternatively or in addition, the material of at least one of the first and second toroidal rings may be permeable to the high-pressure fluid. If the rate of permeation is sufficient, vent(s) may not be necessary.

Each sealing element of the present invention is fabricated in the shape of a toroidal ring, which is defined herein as the body formed by the rotation of a planar figure about a line or axis of rotation which lies in the same plane as the planar figure but does not intersect it. The axis of rotation is the axis of the toroidal ring. The axial cross section of a toroidal ring therefore is defined by the intersection of the ring with a plane, wherein the axis of the toroidal ring lies entirely in the plane. As an illustration, the rotation of a disc about an axis of rotation which lies in the same plane as the disc forms a toroidal ring typically known as an o-ring, and the axial cross section of the o-ring forms a disc.

Each sealing element has an axial cross section forming any planar shape or figure that defines an area having an open side and a closed side. The open side of the figure formed by the cross section is oriented in a generally axial direction relative to the toroidal ring, and the closed side is oriented in a generally opposite direction from the open side. Likewise, the toroidal ring defines a general circumferential volume enclosed or defined by an open side and a closed side. Typically, the open side of the toroidal ring is oriented in a generally axial direction and the closed side is oriented in a generally opposite axial direction from the open side. The circumferential volume typically is oriented in a generally axial direction.

As an example, one of the preferred sealing elements of the invention has an axial cross section defining a U-shaped body in which the open end of the U is oriented in the axial direction and the closed end of the U is oriented in the opposite axial direction. When used in a seal assembly as described below, two U-shaped rings are used with the open side of the inner U inserted into the open side of the outer U-shaped ring. This defines an enclosed volume within this double U assembly. Vents in one or both of the inner and outer U-shaped rings and gaps between the inner and outer U-shaped rings allows fluid to enter the enclosed volume. The inner and outer U-shaped rings are each a toroidal ring defined by the rotation of the U-shaped body about the axis.

As another example, one of the preferred sealing elements of the invention has an axial cross section defining an E-shaped body in which the open end of the E is oriented in the axial direction and the closed end of the E is oriented in the opposite axial direction. When used in a seal assembly as described below, the E-shaped ring is placed with the open side in contact with the ring seal. This defines an enclosed or internal volume within the E-shaped body, since the open end is now closed by the ring seal. Vents in E-shaped ring or the permeability of the material the E-shaped ring is made of, together with gaps between the open end thereof and the ring seal, allows fluid to enter the enclosed volume. The E-shaped ring is a toroidal ring defined by the rotation of the E-shaped body about the axis with the open end oriented in the axial direction.

Other axial cross sections of the sealing element or toroidal ring are possible which form planar figures having other general shapes, some of which can be described schematically by the letters C, E, H, V, W, X, and Y. Other more complex shapes can be envisioned which have similar mechanical properties. The common characteristic of these planar figures is that the toroidal ring defined by each figure has a circumferential volume which is oriented in a generally axial direction and allows one to be placed within another in a similar fashion as the double U assembly to in turn define an internal volume.

During pressure venting, including an explosive decompression event, the pressurized fluid in the internal volume expands and urges the compliant arms or members of the ring to expand against both each other (as in the double U-shaped ring embodiments) and axial surfaces of a seal gland (as in both the double U-shaped ring embodiments and the E-shaped ring embodiment) to temporarily retain and controllably release or vent the pressurized fluid contained in the internal volume. Also, as the pressurized fluid in the internal volume expands, the inner and outer toroidal rings in the double U-shaped ring embodiments are urged axially apart, thereby exerting a compressive force against the seal being protected due to such fluid expansion. In the E-shaped ring embodiment, the expanding pressurized fluid within the internal volume exerts the compressive force against the seal being protected. This allows any fluid that may have permeated therein to escape at a rate that prevents or at least minimizes the deleterious effects of such an event. The fluid within the internal volume is allowed to escape at a controlled rate via permeation or a suitable number and sized vents in one or both of the toroidal rings to allow a sufficient amount of time for fluid to escape from the protected seal.

There is also provided well sealing assembly for sealing between the interior surface of a housing and the exterior of a tubular body. The tubular body having a first exterior surface, a second exterior surface that has a larger diameter than the first exterior surface and a tapered surface between said first and second surfaces. The well sealing assembly comprises a seal ring assembly, an accumulator ring, and means for moving said seal ring assembly axially from its position surrounding said first surface of said tubular member, over said tapered surface and into its set position surrounding said second surface.

The seal ring assembly has a resilient ring with upper and lower flat surfaces, an interior convex surface and an exterior flat surface and annular metal end caps. The metal end caps have flat portions bonded on the upper and lower flat surfaces of the resilient ring, inner legs tapering with the convex interior surface of the resilient ring and outer legs on the flat exterior surface of the resilient ring. The interior surface of the resilient ring is in close spaced relationship to the first surface of the tubular member when said seal ring assembly surrounds the first surface.

The accumulator ring axially positioned adjacent to the seal ring assembly on the side of the seal ring assembly to be exposed to a high-pressure fluid. The accumulator ring has an exterior and an interior. The interior has a void fraction defining an accumulator volume. The accumulator ring has at least one channel providing communication between the exterior of the accumulator ring and the accumulator volume. The channel may be a vent or present in the material due to molecular spacing allowing permeation of a fluid therethrough. In an installed position exposed to high-pressure fluids, the accumulator volume fills with fluid. During pressure venting, for example, an explosive decompression event, the at least one channel allows the fluid in the accumulator ring to escape at a rate sufficient to allow the exterior to compress or support the seal ring assembly for a sufficient amount of time to minimize the explosive decompression effects on the material of the resilient ring of the seal ring assembly.

The resilient ring has sufficient resiliency and volume to expand outward when moved to the set position to seal against the interior housing surface and to move the exterior legs of the end caps into metal-to-metal sealing engagement with the interior housing surface and to seal against the second surface with the interior legs in metal-to-metal sealing engagement with the second surface.

DETAILED DESCRIPTION

Figure 1:
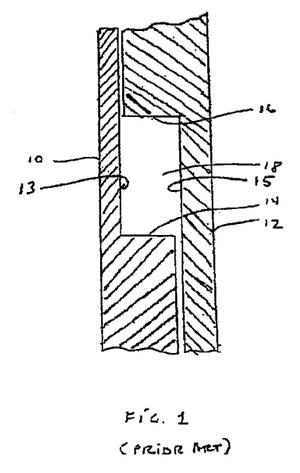
FIGS. 1, 1A and 1B are section views of various seal glands formed between a first member and a second member (prior art).

FIG. 1 is a section view of a first member 10 and second member 12. The first member 10 has a first surface 13 and a shoulder 14, which in this embodiment is the third surface. The second member 12 has a second surface 15 and a shoulder 16, which in this embodiment is the fourth surface. A space or void known as a seal gland 18 is defined by the first surface 13, second surface 15, and shoulders 14 and 16, the third and fourth surfaces respectively.

Figure 1A:
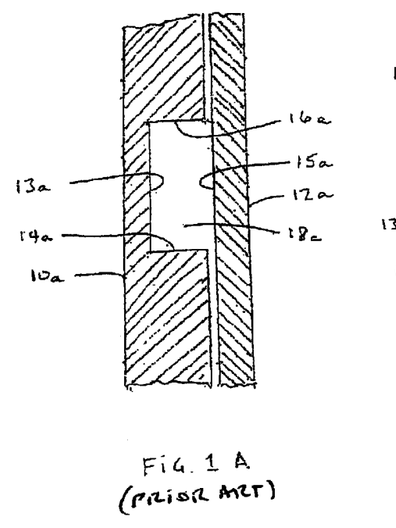

FIG. 1A is a section view of a first member 10a and second member 12a. The first member 10a has a first surface 13a and a shoulder 14a and shoulder 16a, which in this embodiment are the third and fourth surfaces. The second member 12a has a second surface 15a. A space or void known as a seal gland 18a is defined by the first surface 13a, second surface 15a, and shoulders 14a and 16a, the third and fourth surfaces respectively.

Figure 1B:
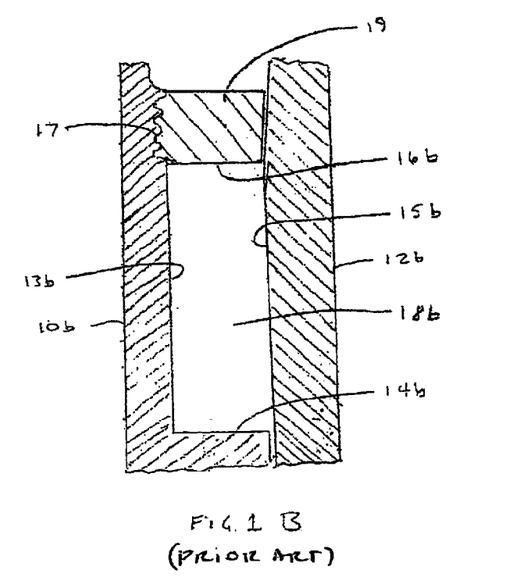

FIG. 1B is a section view of a first member 10b and second member 12b. The first member 10b has a first surface 13b, a threaded portion 17 and a shoulder 14b, which in this embodiment is the third surface. The first surface 13b is located between the threaded portion 17 and the shoulder 14b. The second member 12b has a second surface 15b. A threaded member 19 has a bottom surface 16b, which in this embodiment is the fourth surface. The threaded member 19 in an installed position threadedly engages the threaded portion 17. A space or void known as a seal gland 18b is defined by the first surface 13b, second surface 15b, bottom surface 16b and shoulder 14b, the latter two being the third and fourth surfaces respectively.

Figure 3:
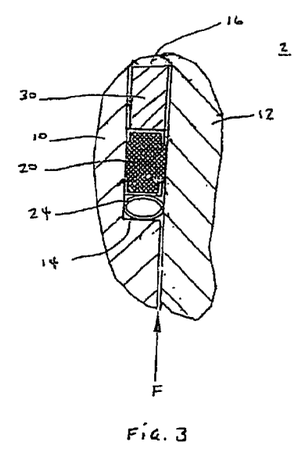
FIG. 3 is a section view showing a seal retainer, a metal end cap seal, and a hollow, vented o-ring according to a second embodiment of the present invention.
Figure 9:
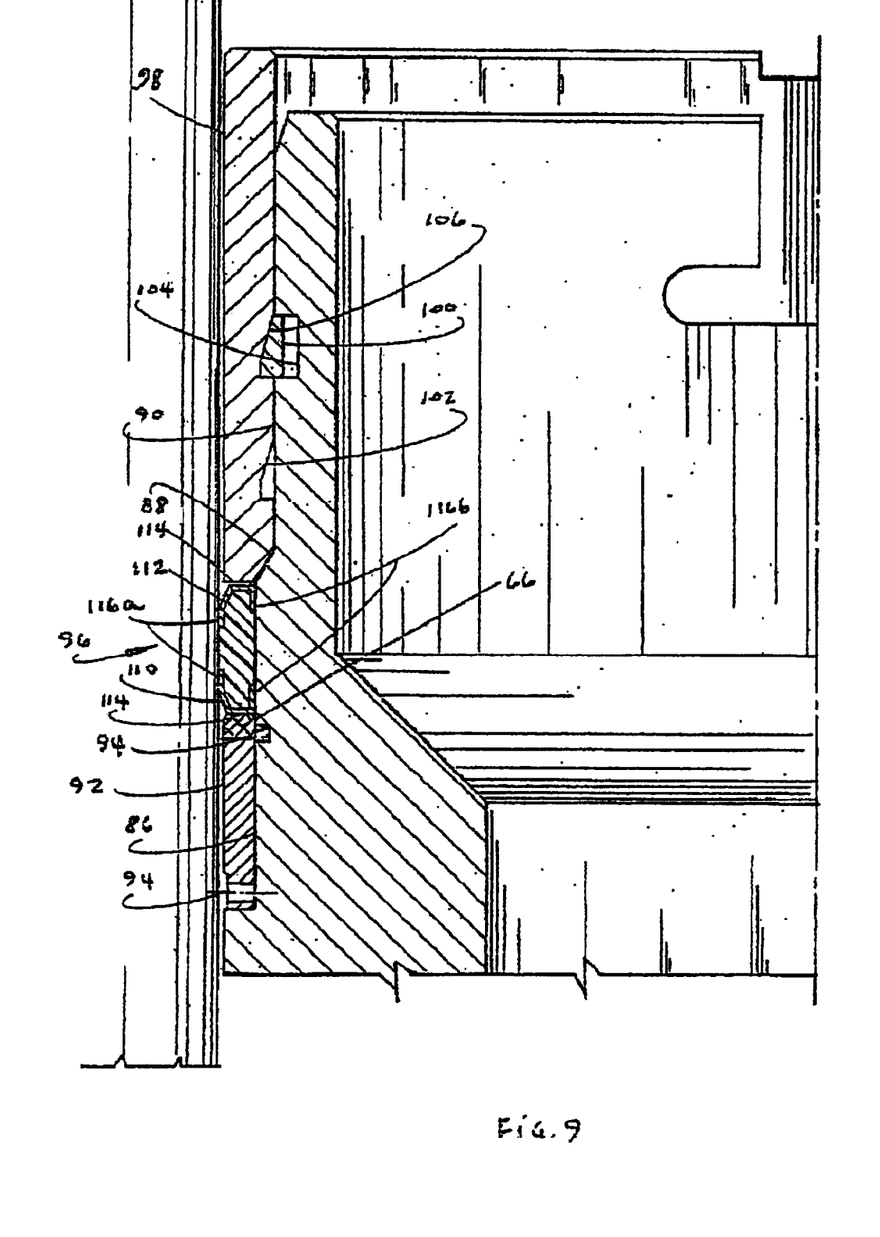
FIG. 9 is a view similar to FIG. 8 illustrating the set position of the sealing assembly.

Other seal gland embodiments are shown in FIG. 3 and FIG. 9.

Figure 2:
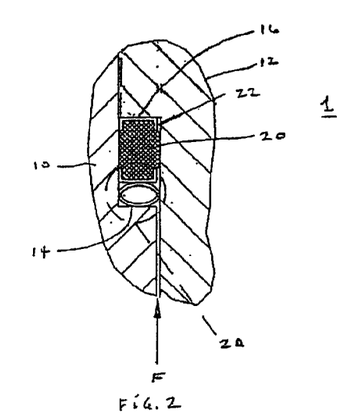
FIG. 2 is a section view showing a metal end cap seal and a hollow, vented o-ring according to a first embodiment of the present invention.
Figure 2A:
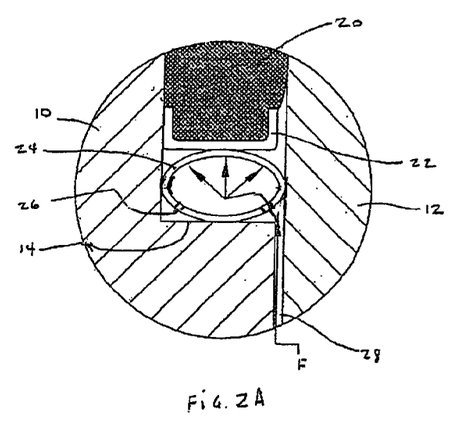
FIG. 2A is an enlarged section view of circle 2A in FIG. 2 showing the metal end cap seal and the hollow, vented o-ring according to a first embodiment of the present invention.
Figure 2B:
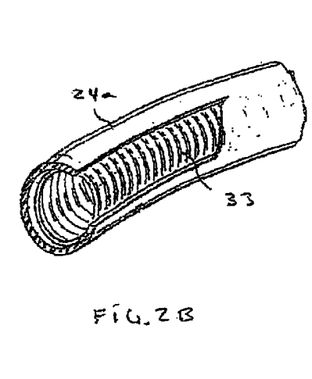
FIG. 2B is a partial section view of a hollow o-ring containing a spring according to another embodiment of the present invention.

In a first embodiment of the present invention shown in FIGS. 2 and 2A, the seal gland 18 of seal assembly 1 contains a metal end cap seal 20 in the set position and a hollow o-ring 24. Though seal gland 18 is depicted herein, any other seal gland may be used which is defined by four surfaces, for example, those shown in FIGS. 1A, 1B, 3 and 9. The hollow o-ring 24 has vents 26. In the set position, the metal end cap seal 20 seals against surfaces 13 and 15. The hollow o-ring 24 is made of a material that substantially retains its shape during the setting of the metal end cap seal 20. The o-ring 24 may be a hollow metal o-ring or of an elastomeric material. In another embodiment of the o-ring 24, a spring 33, for example, a helical or wave spring, as shown in FIG. 2B can be contained within the hollow o-ring in this embodiment referred to a 24a to aid in retaining the shape of the o-ring 24a during the setting operation.

During high-pressure operations, the fluid follows path F through gap 28. The seal made by the metal end cap seal 20 against surfaces 13 and 15 prevents the fluid from getting passed this point. The high-pressure fluid, typically a gas, enters the interior of the o-ring 24 through vents 26.

During pressure venting, including an explosive decompression event, some of the gas may have permeated the non-metal portions of the metal end cap seal 20 behind metal end cap 22 on the high-pressure side. The rapid decompression causes the gas that has permeated into the metal end cap seal 20 to expand rapidly. To prevent or at least minimize the deleterious effects of rapid pressure venting or explosive decompression on the non-metallic portions of the metal end cap seal 20, the vents 26 and the interior of the o-ring 24 are sized to gradually release the rapidly expanding gas contained therein. This causes the o-ring to exert a compressive force against the metal end cap seal 20. This compressive force allows the gas trapped within the metal end cap seal 20 to be released at a rate that prevents or minimizes these deleterious effects on the seal 20. The compressive load applied to the metal end caps seal 20 by the accumulator ring during the venting process simply supports the elastomer of the metal end cap seal 20 and therefore prevents its elastomeric material from axially elongating too far and rupturing.

If a spring 33 is contained within the o-ring 24a, it can also provide continuous compressive loading against the seal 20. In this case, the compressive loading provided by the spring 33 is a backup for the compressive or support force provided by the expanding gases. Further, with the spring, the sizing of the interior of the o-ring 24a and the vents 26 is less critical. If desired, the spring 33 can be sized to provide the required compressive load without relying on the compressive force generated by the expanding gas within the o-ring 24a. However, since it is believed that the axial compressive forces developed by the o-ring on the seal at high pressures is so much greater than could be provided with the spring, the spring's role would in many cases be an expander or restorer for the o-ring 24a.

In a second embodiment of the present invention shown in FIG. 3, seal assembly 2 is similar to seal assembly 1 shown in FIG. 2, with the exception that the seal gland 18 of seal assembly 2 further contains a seal retainer 30.

Figure 4:
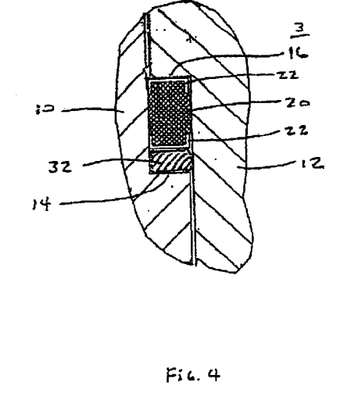
FIG. 4 is a section view showing a metal end cap seal and a permeable, solid o-ring according to a third embodiment of the present invention.

In a third embodiment of the present invention shown in FIG. 4, seal assembly 3 is similar to seal assembly 1 shown in FIG. 2, with the exception that the hollow o-ring 24 has been replaced by a solid o-ring 32. O-ring 32 is made of a material that is permeable by the high-pressure gas. The o-ring 32 is sized to allow a sufficient amount of gas to permeate and accumulate within it; and, during pressure venting including an explosive decompression event, o-ring 32 expands as a result of the gas rapidly expanding therein trying to escape. This expansion exerts a compressive force against seal 20 to prevent or at least minimize the explosive decompression effects on seal 20. The rate of gas escape from the o-ring 32 is less than that of the non-metallic material of the seal 20.

Figure 5:
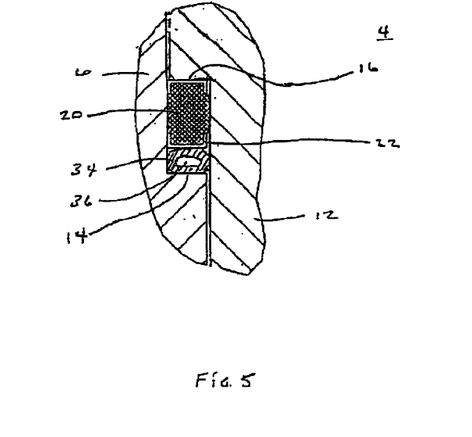
FIG. 5 is a section view showing a metal end cap seal and a hollow, permeable o-ring according to a fourth embodiment of the present invention.

In a fourth embodiment of the present invention shown in FIG. 5, seal assembly 4 is similar to seal assembly 1 shown in FIGS. 2 and 2A, with the exception that the hollow o-ring 24 has been replaced by a hollow o-ring 34. O-ring 34 is made of a material that is permeable by the high-pressure gas. The interior void 36 of o-ring 34 is sized to allow a sufficient amount of gas to permeate and accumulate within it and during an explosive decompression event expands as a result of the gas rapidly expanding therein trying to escape. This expansion exerts a compressive force against seal 20 to prevent or at least minimize the explosive decompression effects on seal 20. The rate of gas escape from the o-ring 34 is less than that of the non-metallic material of the seal 20.

Figure 6:
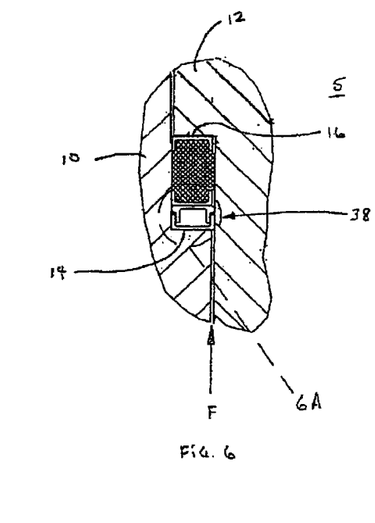
FIG. 6 is a section view showing a metal end cap seal and a slip U-assembly according to a fifth embodiment of the present invention.
Figure 6A:
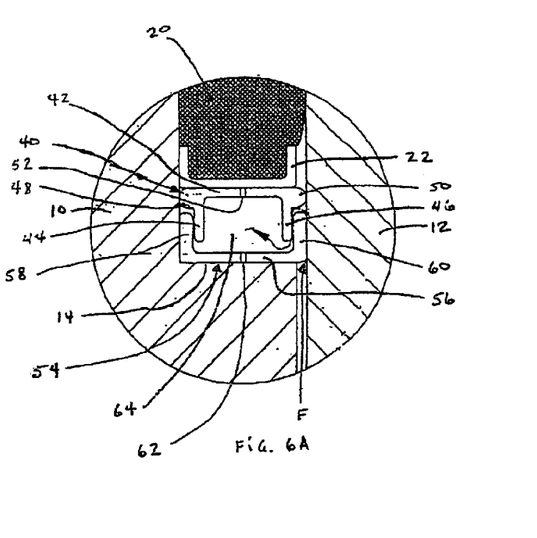
FIG. 6A is an enlarged section view of circle 6A in FIG. 6 showing the metal end cap seal and the slip U-assembly according to a fifth embodiment of the present invention.

In a fifth embodiment of the present invention shown in FIGS. 6 and 6A, seal assembly 5 is similar to seal assembly 1 shown in FIG. 2, with the exception that the hollow o-ring 24 has been replaced by a slip double U assembly 38. The slip double U assembly has an inner U-shaped ring 40 and an outer U-shaped ring 54. The inner U-shaped ring 40 has a back 42, a vent or vents 52 in the back 42, legs 44 and 46 axially extending substantially perpendicular from the back 42, and outer U leg stops 48 and 50 radially extending from the back 42 in opposite directions. The outer U-shaped ring 54 has a back 56, a vent or vents 62, and legs 58 and 60 axially extending substantially perpendicular from the back 56. The radial spacing between the outside surfaces of legs 44 and 46 is less than the radial spacing of the inner surfaces of legs 58 and 60. The inner U-shaped ring 40 is inserted into the outer U-shaped ring 54 with the legs 58 and 60 placed adjacent to the outer U leg stops 48 and 50, respectively. This placement of the inner and outer U-shaped rings 40 and 54, respectively, defines an internal volume or void 64. The interior volume 64 of the slip double U assembly 38 is sized to allow a sufficient amount of gas to accumulate within it to allow the assembly 38 to exert a compressive force against the seal 20 during an explosive decompression event for a sufficient amount of time to prevent or at least minimize the deleterious effects of the explosive decompression event to seal 20.

During pressure venting, including an explosive decompression event, the fluid within the volume 64 rapidly expands. The fluid may initially be a liquid that converts to a gas or a pressurized gas that rapidly expands during such an event. The vents 52 and 62 are of a size and number that allows the rapidly expanding gas in volume 64 to exert an outward force against the interior surfaces of the double U assembly 38. This gas expansion causes legs 44 and 46 to radially diverge and place an outward load against legs 58 and 60 creating a seal to prevent gas escape therebetween. Therefore, the only gas escape route is via vents 52 and 62. The gas expansion also causes the inner and outer U-shaped rings to axially diverge from each other with legs 44 and 46 and legs 58 and 60, respectively, slipping over each other as the gas continues to expand. This gas expansion places a compressive load against the seal 20 to prevent or at least minimize the explosive decompression effects on seal 20. The rate of gas escape from the slip double U assembly 38 is controlled by the size and number of vents 52 and 62 in the inner and outer U-shaped rings 40 and 54, respectively.

Figure 6B:
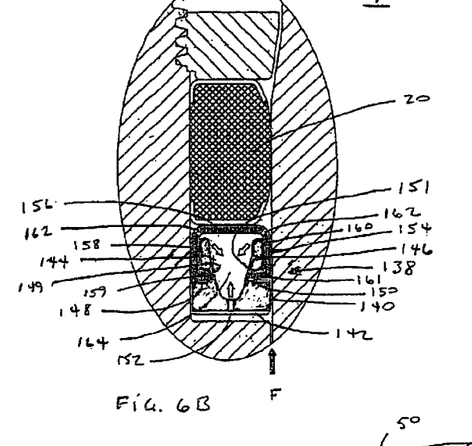
FIGS. 6B and 6C are section view showing a metal end cap seal and an interlocking U-assembly according to a sixth embodiment of the present invention.
Figure 6C:
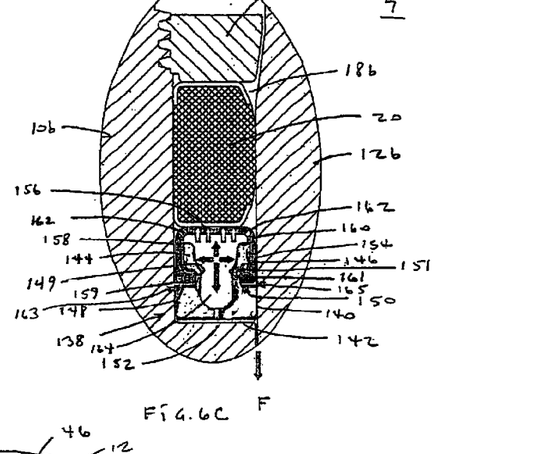

In a sixth embodiment of the present invention shown in FIGS. 6B and 6C, seal assembly 7 is similar to seal assembly 5 shown in FIGS. 6 and 6A, with the exception that the slip double U assembly 38 has been replaced by an interlocking double U assembly 138. The interlocking double U assembly has an inner U-shaped ring 140 and an outer U-shaped ring 154. The inner U-shaped ring 140 has a back 142, a vent or vents 152 in the back 142, legs 144 and 146 axially extending substantially perpendicular from the back 142, outer U leg stops 148 and 150 radially extending from the back 142 in opposite directions, and grooves 149 and 151, for example, adjacent the outer U leg stops 148 and 150. The outer U-shaped ring 154 has a back 156, a vent or vents 162, legs 158 and 160 axially extending substantially perpendicular from the back 156, and ridges 159 and 161. Ridges 159 and 161 are adapted to matingly engage grooves 149 and 151, preferably with the grooves 149 and 151 sized to be axially wider than the corresponding ridges 159 and 161. As seen in FIG. 6C, this difference in axial width shown as gaps 163 and 165 allows the respective U-shaped rings 140 and 154 to expand and contract in the axial direction. The radial spacing between the outside surfaces of legs 144 and 146 is less than the radial spacing of the inner surfaces of legs 158 and 160. The inner U-shaped ring 140 is inserted into the outer U-shaped ring 154 with the legs 158 and 160 placed adjacent to the outer U leg stops 148 and 150, respectively. This placement of the inner and outer U-shaped rings 140 and 154, respectively, defines an internal volume or void 164. The interior volume 164 of the interlocking double U assembly 138 is sized to allow a sufficient amount of gas to accumulate within it to allow the assembly 138 to exert a compressive or supporting force against the seal 20 due to gas expansion within the internal volume 164 during an explosive decompression event for a sufficient amount of time to prevent or at least minimize the deleterious effects of the rapid pressure venting or explosive decompression event to seal 20. In FIGS. 6B and 6C, a seal gland 18b is used as depicted in FIG. 1B, though any of the other seal glands can be used.

During pressure venting, including an explosive decompression event, the fluid within the volume 164 rapidly expands. The fluid may initially be a liquid that converts to a gas or a pressurized gas that rapidly expands during such an event. During such an event, the fluid within the interior volume 164 expands faster than it can escape therefrom. Specifically, in this embodiment, the vents 152 and 162 are of a size and number that allows the rapidly expanding gas in volume 164 to exert an outward force against the interior surfaces of the double U assembly 138 (see black arrows in FIG. 6C). This expansion causes legs 144 and 146 to radially diverge and place an outward load against legs 158 and 160 creating a seal to prevent gas escape therebetween. Therefore, the only escape route for the gas contained in the internal volume 164 is via vents 152 and 162. The expansion also causes the inner and outer U-shaped rings 140 and 154 to axially diverge from each other. This axial divergence is initially limited by the difference in width between the width of the grooves 149 and 151 and the width of the ridges 159 and 161 with legs 144 and 146 and legs 158 and 160, respectively, slipping over each other as the gas continues to expand producing the gaps 163 and 165 shown in FIG. 6C. If the differential pressure is sufficiently great between the interior and exterior of the volume 164, the ridges 159 and 161 will ride up on the grooves 149 and 151. The U-shaped rings 140 and 154 will try to disengage from each other as the U-shaped rings 140 and 154 continue to axially move apart until there is no additional room left in the seal gland to do so. This expansion places a compressive load against the seal 20 to prevent or at least minimize the explosive decompression effects on seal 20 (see white arrows showing direction of force exerted on back 156 acting on seal 20). The rate of gas escape from the interlocking double U assembly 138 is controlled by the size and number of vents 152 and 162 in the inner and outer U-shaped rings 140 and 154, respectively.

The slip double U assembly 38 and the interlocking double U assembly 138 are made of materials that have the properties and capabilities described above. One example of such materials are high performance engineering plastics. One such plastic is polyether ether ketone, also known as PEEK, which is a strong polymer that would flex slightly during venting, withstand the stresses placed on it in operation, but would still provide an adequate seal between the legs of the inner and outer U-shaped rings during venting to minimize fluid escape therebetween. This would force the expanding fluid to exit the respective assembly by flowing through the vent holes provided.

Figure 6D:
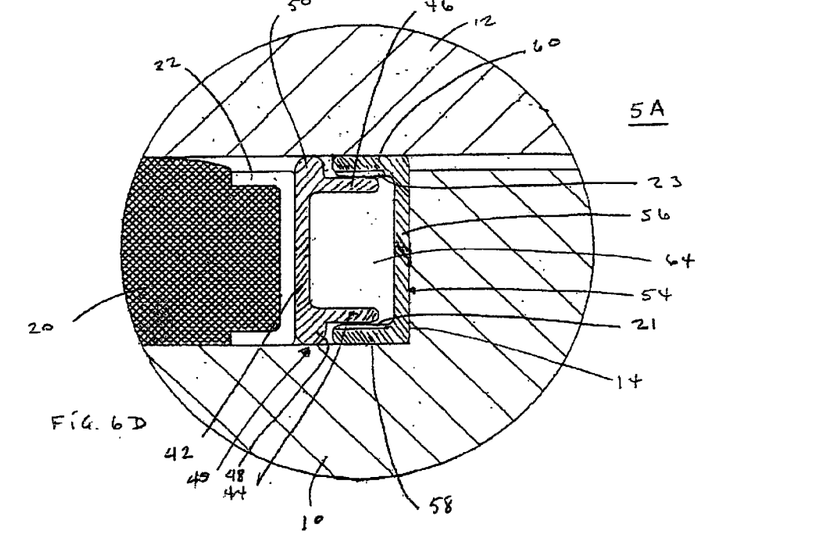
FIG. 6D is a section view showing a metal end cap seal and a slip U-assembly according to a seventh embodiment of the present invention, similar to that shown in FIG. 6 with the exception that grooves in a pair of legs of one of the U-shaped members rather than vent holes in each of the two U-shaped members of the fifth embodiment.

In a seventh embodiment of the present invention shown in FIG. 6D, seal assembly 5A is similar to seal assembly 5 shown in FIGS. 6 and 6A. However, rather than having vent holes extend through one or both of the U-shaped rings, seal assembly 5A has the vent holes formed by having axial grooves 21 and 23 provided on at least one pair of legs corresponding to one of the U-shaped rings. When the two U-shaped rings are engaged, the grooves 21 and 23 on one pair of legs together with the adjacent legs of the other U-shaped ring define the venting holes.

Figures 6E, 6F:
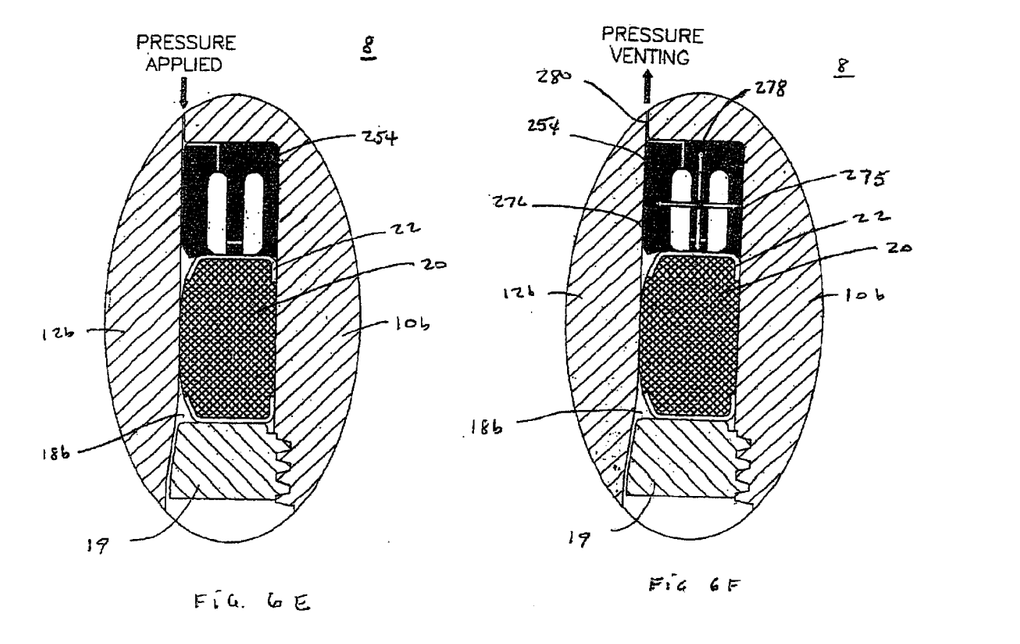
FIGS. 6E and 6F are section view showing a metal end cap seal and an E-shaped ring according to an eighth embodiment of the present invention, with FIG. 6G depicting a section view of the E-shaped ring alone.
Figure 6G:
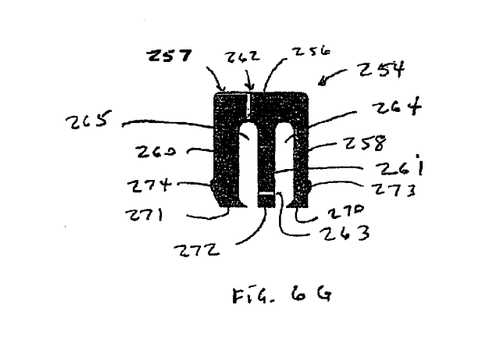

In an eighth embodiment of the present invention shown in FIGS. 6E, 6F and 6G, seal assembly 8 shown in FIGS. 6E and 6F is similar to seal assembly 5 shown in FIGS. 6 and 6A, with the exception that the slip double U assembly 38 has been replaced by a single E-shaped toroidal ring 254. The seal gland is like that shown in FIGS. 6B and 6C. Ring 254 depending on perspective can also be described as M-shaped or W-shaped.

As shown more clearly in FIG. 6G, the cross-section of ring 254 reveals that it has a back 256, a vent or vents 262, a lateral channel 257 intersecting the vent 262, outer legs 258 and 260 having ends 270 and 271, respectively, a central leg 261 having end 272, an equilibration vent 263, ribs or ridges 273 and 274, and internal volumes or voids 264 and 265. Though optional, the central leg 261 is preferably present to provide ring 254 with increased load support capability. Ribs 273 and 274 are also optional, but preferred so as to provide a better seal of leg 258 and 260 against the adjacent surfaces 275 and 276 of members 10b and 12b, respectively, during pressure venting. Vent or vents 262 are also optional if ring 254 is made of a permeable material that has a suitable permeability rate.

In an installed position, the ends 270, 271 and 272 contact the metal cap 22. The cooperation of the ring 254 and the metal cap 22 closes the open end of ring 254 allowing pressurized fluid to fill the internal volumes 264 and 265. During pressure venting, such as an explosive decompression event, the pressurized fluid in the internal volumes 264 and 265 exerts forces in the directions of the arrows shown in FIG. 6F. In one aspect, such forces push outward in a radial direction on legs 258 and 260 forcing ribs 273 and 274 into sealing engagement with surfaces 275 and 276, respectively. In another aspect, the back 256 is pushed against surface 278, thereby filling the seal gland volume. Further, as the pressurized fluid contained within the internal volumes 264 and 265 expands, this expanding fluid also exerts a supporting force on the metal cap 22 of ring seal 20. Vent 256 and channel 263 with gap 280 cooperate to controllably release the pressurized fluid temporarily retained in the internal volumes 264 and 265 at a rate sufficient to allow any fluid contained within ring seal 20 to escape at a rate that will minimize the effects of rapid pressure venting thereto.

The o-rings 24, 32, and 34 may be made of any suitable semi-permeable elastomeric material that have the properties and capabilities described above that would flex during venting, withstand the stresses placed on it in operation, and return to its original pre-venting shape after the venting event has stabilized or a repressurization has occurred and re-stabilized. One example of such materials are materials having a durometer of at most that of the elastomeric portion of the seal 20. One example of such a material is nitrile rubber, preferably having a durometer of at least 70. Note unless otherwise specified, a durometer value specified herein is based on the Shore A scale, which is determined pursuant to ASTM D-1415.

The accumulator ring, in any of the foregoing embodiments, preferably provides at least 30 minutes of protection to the seal 20 during an explosive decompression or venting event to avoid or minimize the adverse effects of such an event on the seal 20.

One particular application for the embodiments of the present invention is in the drilling and production area, for example, in the seal assembly disclosed in U.S. Pat. No. 4,496,162, which is hereby incorporated by reference. The seal assembly thereof is modified to include an accumulator ring 66 of the present invention. Accumulator ring 66 may be any of those disclosed previously in the first through fifth embodiments as the hollow, vented o-ring 24 (FIGS. 2, 2A and 3), solid o-ring 32 (FIG. 4), hollow permeable o-ring 34 (FIG. 5), slip double U assembly 38 (FIGS. 6 and 6A), interlocking double U assembly 138 (FIGS. 6B and 6C), and E-shaped ring 254 (FIGS. 6E, 6F and 6G). Reference is now made to FIGS. 7 through 10.

Figure 7:
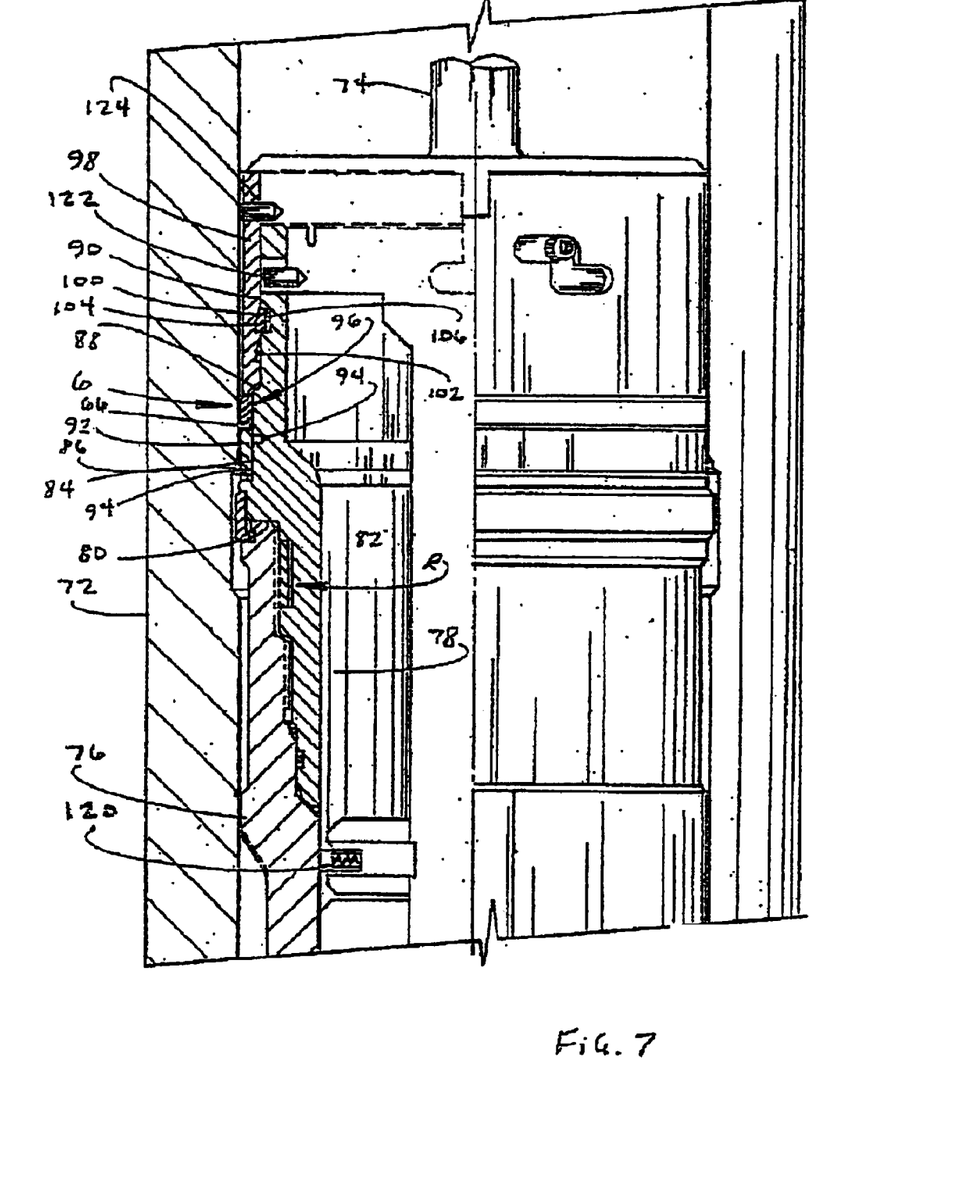
FIG. 7 is a partial sectional view of a well housing with the improved sealing assembly of the present invention shown in half section and with its running tool.
Figure 8:
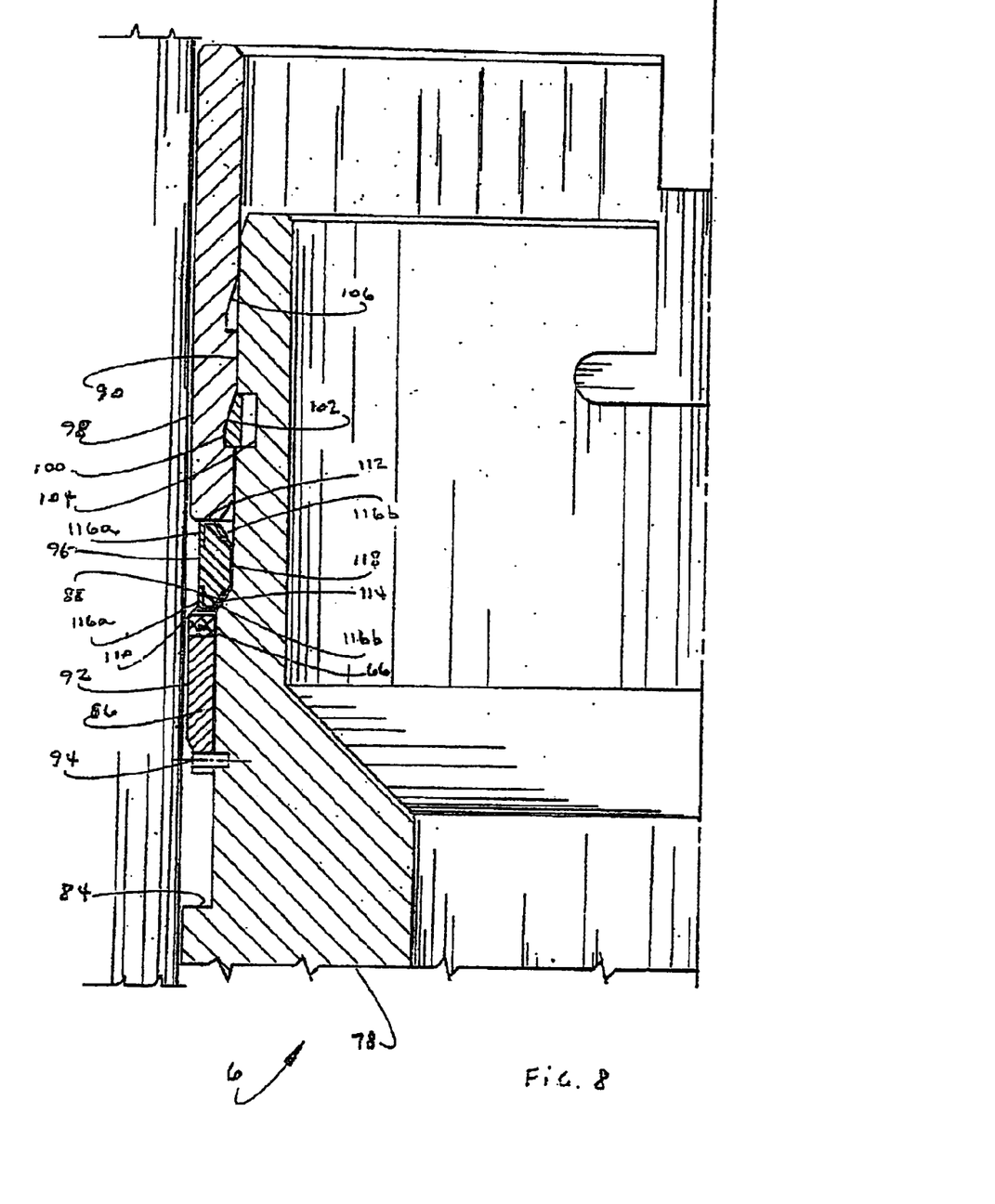
FIG. 8 is a partial sectional view of the unset or running position of the sealing assembly.

Improved sealing assembly 6 of the present invention is deployed to, for example, a subsea well housing 72 on running tool 74. Sealing assembly 6 is landed on and connected to hanger 76 supported in housing 72 in a known manner. Tubular body 78 of sealing assembly 6 engages hanger 76 through the ratchet (spring loaded, threaded segments) connection R and has its external downwardly facing shoulder 80 engaged on upper surface 82 of hanger 76.

Sealing assembly 6 includes tubular body 78, having upwardly facing external shoulder 84, outer surface 86, inwardly and upwardly tapering surface 88, and upper surface 90 which is smaller in diameter than surface 86, back-up ring 92 surrounding and releasably connected to surface 86 by shear pin 94, seal ring assembly 96 and accumulator ring 66 above ring 92 and setting sleeve 98 above seal ring assembly 96. In the unset or running position as shown schematically in FIG. 8, running tool 74 being removed for clarity, back-up ring 92 is positioned around surface 86 and extends upward to the bottom of tapered surface 88 into abutting relationship with seal ring assembly 96, which in turn is in abutting relationship with the accumulator ring 66. Setting sleeve 98 engages the upper end of seal ring assembly and surrounds surface 90. Tapered split ring 100 is positioned in groove 102 in sleeve 98 and in groove 104 in body 78. Split ring 100 and shear pin 94 retains sleeve 98, sealing assembly 96, accumulator ring 66 and back-up ring 92 in position during running. If desired, a pin or pins in back-up ring sliding in a slot in the exterior of body 78 can be used to assist to maintain the elements in position on body 78 during running. Sleeve 98 has internal groove 106 above groove 102 for the purposes hereinafter set forth.

Figure 10:
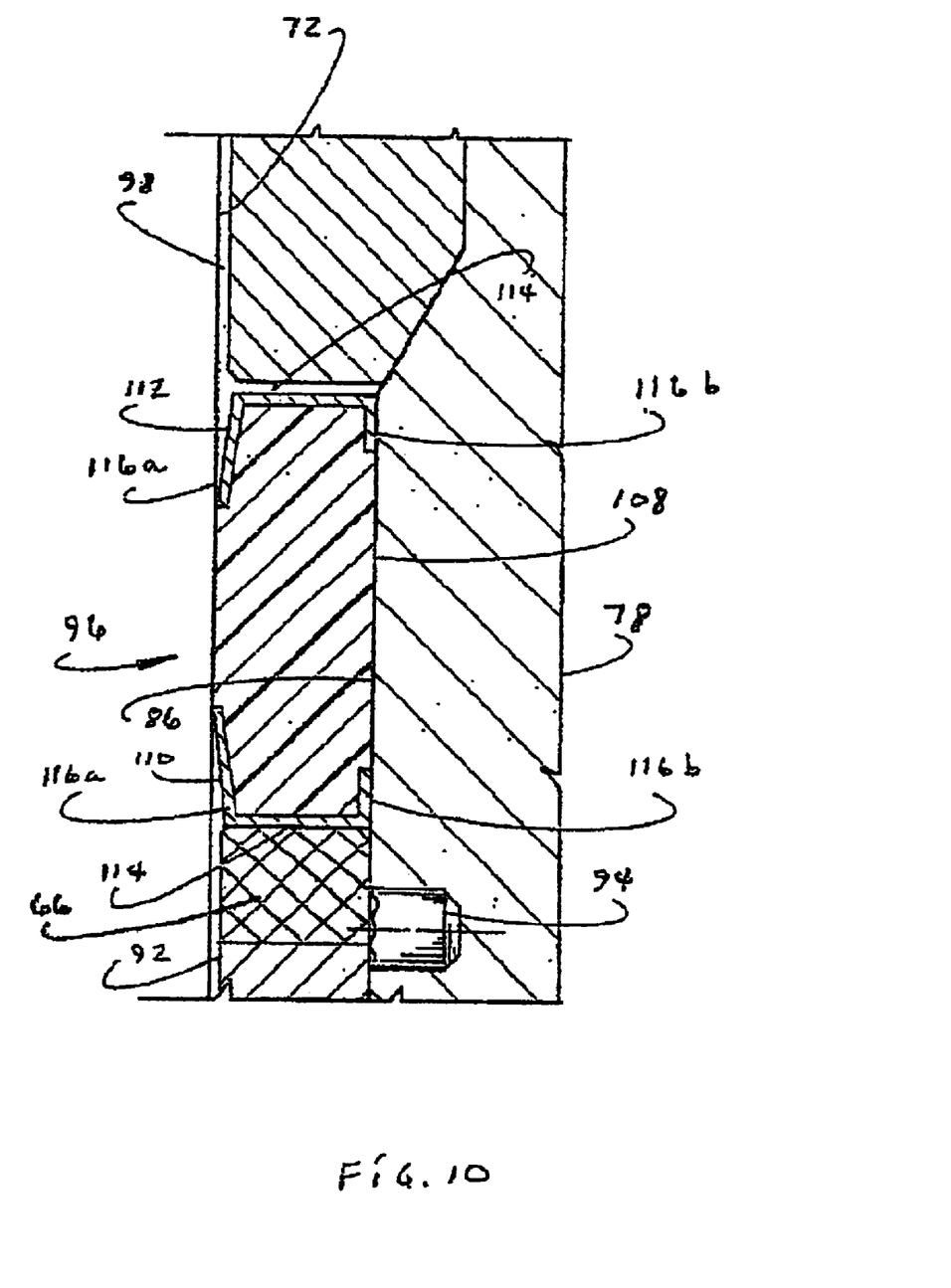
FIG. 10 is an enlarged partial sectional view of the set position of the seal ring assembly.

Seal ring assembly 96 includes resilient ring 108 having metal end caps 110 and 112 on its upper and lower ends as shown and preferably bonded thereto. End caps 110 and 112 have a central portion 114 with legs 116 (including inner legs 116b and outer legs 116a) extending upwardly and downwardly, respectively, in a direction toward the midpoint of resilient ring 108. The inner central portion 118 of resilient ring 108 is convex and extends inward into light engagement or close spaced relationship with surface 90 in its unset position. It is preferred that resilient ring 108 be made of an elastomeric material, such as a nitrile rubber as sold by B. F. Goodrich Company under the trademark HYCAR, and metal end caps are a thin type 316 stainless steel. The metal end caps and the elastomeric portion of the seal ring assembly 96 can be coated with Teflon material, for example, to prevent the sticking of the seal ring assembly 96 to the first and second surfaces of the seal gland.

During running, sealing assembly 6 is supported on running tool 74 by pins 120 and 122. Upon landing of assembly 6 running tool 74 is rotated to tighten connection R and then it is lowered to cause pin 124 to engage sleeve 98 and move it downward to the position shown in FIG. 9. This downward movement shears pin 94 and moves seal ring assembly 96 and accumulator ring 66 downward onto outer surface 86. This downward movement of seal ring assembly 96 moves it radially outward on tapered surface 88 and onto larger diameter surface 86. Thus, this downward movement provides the radial energization of seal ring assembly 96 to move it to its sealing position between surface 86 and the inner surface of housing 72. In this position there is metal-to-metal seals of the legs 116a of end caps 110 and 112 with the sealing surfaces of housing 72 and body 78 because the inner central portion 118 of ring 108 is compressed radially outward which creates an internal force on the outer legs of the end caps outward, toward their related sealing surface. This force ensures that the inner legs 116b also are held in sealing engagement with surface 86. While this seal is energized by axial movement, which can be a weight set as shown, a screw set or other actuation, it creates the radial energizing of resilient ring 108 which ensures sealing and requires no axial load to maintain sealing after having been energized. During this setting movement of setting sleeve 98 the taper on groove 102 moves split ring 100 into groove 104 until sleeve 98 moves down to cause groove 106 to align with groove 104 at which position snap ring 100 moves into groove 106 and locks sleeve 98 against upward movement to thereby retain sealing assembly 6 in its set position. In this set position, resilient ring 96 is free to expand axially but is restricted from radial movement by surface 86 and the inner surface of housing 78.

The improved sealing assembly provides a long life well annulus seal which is suitable for use in high pressure and high temperature environments and is radially energized so that a thread or weight setting load are not necessary to maintain the seal. Further, this assembly does not require the application and maintenance of a fluid under pressure to maintain the seal. There is no extrusion of the resilient ring by well pressure as it is completely encased at its ends by the end caps which provide the metal-to-metal annulus seal. Further, if it becomes necessary to retrieve the seal assembly from the well bore, this can be easily done by lifting the assembly upward in which case the metal end caps ensure that subsequent upward travel through the well bore does not pull off a section of the seal and possibly hang the seal assembly or drop a segment of the seal into the well.

Additionally, the accumulator ring protects the seal ring assembly from explosive decompression by placing the seal ring assembly under compression in such an event thereby avoiding or minimizing the deleterious effects of such an event on the seal ring assembly, which is also a ring seal.

Figure 11:
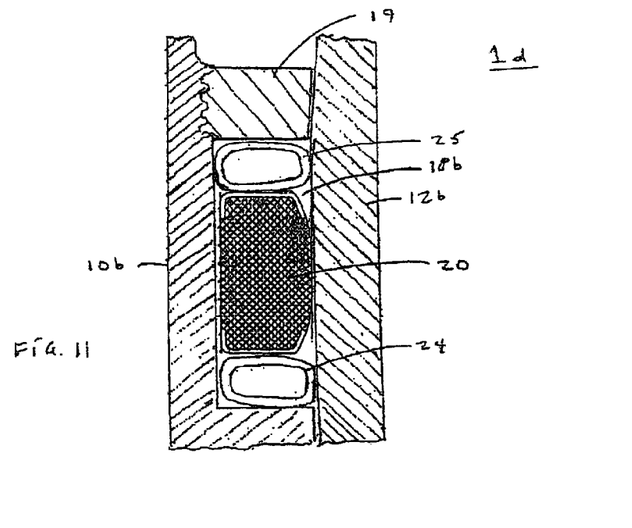
FIG. 11 is a section view showing a metal end cap seal and a hollow, permeable o-ring on either side of the metal end cap seal according to a ninth embodiment of the present invention.

In a ninth embodiment of the present invention as shown in FIG. 11, the seal gland 18b as shown in FIG. 1B is depicted with seal assembly 1d which contains a metal end cap seal 20 in the set position and two hollow o-rings 24 and 25 with one on each side of the seal 20. Though seal gland 18b is depicted herein, any other seal gland may be used which is defined by four surfaces, for example, those shown in FIGS. 1A, 1B, 3 and 9. Further, though the accumulator rings shown herein are hollow o-rings 24 and 25, the accumulator rings may be any of those disclosed previously in the first through seventh embodiments as the hollow, vented o-ring 24 (FIGS. 2, 2A and 3; used in FIG. 11), solid o-ring 32 (FIG. 4), hollow permeable o-ring 34 (FIG. 5), slip double U assembly 38 (FIGS. 6 and 6A and FIG. 6D), interlocking double U assembly 138 (FIGS. 6B and 6C), and an E-shaped ring 254 (FIGS. 6E, 6F and 6G). Additionally, the two accumulator rings can be the same or different.

A variation of the present invention is the attachment of at least a portion of the accumulator ring to at least a portion of the ring seal. In one aspect, this will facilitate installation. For example, vented o-ring 24 (FIGS. 2, 2A and 3), solid o-ring 32 (FIG. 4), and hollow o-ring 34 (FIG. 5) can be attached to the ring seal, for example, at the point of contact thereof with the metal end cap 22 of ring seal 20. Similarly, the ends 270, 271 and optionally 272 of legs 258, 260 and 263 of E-shaped ring 254 (FIGS. 6E, 6F and 6G) can be attached to the ring seal, for example, at the point of contact thereof with the metal end cap 22 of the ring seal 20. Relative to the double U-shaped rings 38 (FIGS. 6, 6A and 6D) and 138 (FIGS. 6B and 6C), the back 42 of ring 40 and the back 156 of ring 158 can be attached or even integral to, for example, the metal end cap 22 of ring seal 20.

Although variations in the embodiment of the present invention may not each realize all the advantages of the invention, certain features may become more important than others in various applications of the device. Therefore, the invention should be understood to be limited only by the scope of the appended claims.

What is claimed:

1. A seal assembly for high pressure applications, said assembly comprising:
    a female member having a longitudinal bore and an annular shoulder in the bore;
    a male member insertable into the female member bore, having an annular shoulder on the outer surface thereof, wherein the male and female members are joined and define a seal gland between the shoulders thereof;
    a ring seal positioned within the seal gland, wherein the ring seal has a non-metallic portion which is axially compressed to sealingly engage the male member and the female member bore in the set position and wherein the non-metallic portion is a major portion of the ring seal and is susceptible to explosive decompression effects; and
    an accumulator ring positioned within the seal gland on the side of the ring seal to be exposed to a high pressure fluid, wherein said accumulator ring has an exterior and an interior, wherein the interior has a void fraction defining an accumulator volume and said accumulator ring has at least one channel providing communication between the exterior of the accumulator ring and the accumulator volume, wherein in an installed position exposed to high pressure fluids, the accumulator volume fills with fluid and during an explosive decompression event, the at least one channel allows the fluid in the accumulator ring to escape at a rate sufficient to allow the exterior to compress the ring seal for a sufficient amount of time to minimize the explosive decompression effects on the non-metallic portion of the ring seal.

2. A seal assembly according to claim 1, wherein the accumulator ring and the ring seal fill the seal gland in an installed position.

3. A seal assembly according to claim 1, further comprising:
    a seal retainer placed in the seal gland, the seal retainer having a first end and a second end, the first end configured to contact the annular shoulder of the male member and the second end configured to contact the ring seal to compress the ring seal axially.

4. A seal assembly according to claim 3, further comprising:
    locking means to limit axial movement of the seal retainer.

5. A seal assembly according to claim 4, wherein the locking means is a clip engageable with the female member bore to hold the retainer in the bore.

6. A seal assembly according to claim 1, wherein the accumulator ring is an o-ring provided with at least one vent hole between the exterior and interior of the o-ring.

7. A seal assembly according to claim 1, wherein the accumulator ring is an o-ring that is pressure-energized to engage the ring seal and the shoulder abutting accumulator ring in response to an explosive decompression event in the seal assembly.

8. A seal assembly according to claim 1, wherein the accumulator ring is made of a material permeable by the high pressure fluid, wherein the extent of permeation of the high pressure fluid is the void fraction, and the material releases the permeated fluid therefrom during an explosive decompression event at a slower rate than the seal ring, thereby allowing the accumulator ring to expand and load the ring seal within the seal gland to minimize the explosive decompression effects on the ring seal.

9. A seal assembly according to claim 8, wherein the accumulator ring is also partly hollow providing an additional volume for containing the high pressure fluid that has permeated through the material and increasing the void fraction.

10. A seal assembly according to claim 1, wherein the accumulator ring has at least:
    a first toroidal ring and
    a second toroidal ring,
    wherein each of the first and second toroidal rings has an axial cross section that defines a planar figure, the planar figure partially encloses an area having an open side and a closed side, and the open side of the first toroidal ring is placed within the open side of the second toroidal ring with the closed sides of the first and second toroidal rings opposing each other and the thus positioned first and second toroidal rings defining an enclosed volume therewithin and an exterior surface.

11. A seal assembly according to claim 10, wherein the planar figure formed by the axial cross section of the first and second toroidal rings is U-shaped and the first and second toroidal rings each being a U-shaped toroidal ring having an open side and a closed side.

12. A seal assembly according to claim 10, wherein at least one of the first and second toroidal rings has at least one vent to allow high pressure fluid to enter the enclosed volume and the number and size of the at least one vent are such that during an explosive decompression event the at least one vent allows the fluid within the enclosed volume to exit at a sufficient rate to have the fluid remaining within the enclosed volume urge the first and second toroidal rings to expand radially against each other and the male member and axially against the ring seal and the shoulder abutting the accumulator ring to axially compress the ring seal for a sufficient amount of time to minimize the explosive decompression effects on the ring seal.

13. A seal assembly according to claim 10, wherein at least one of the first and second toroidal rings is made of a material that allows high pressure fluid to permeate through the material and enter the enclosed volume and during an explosive decompression event the rate of permeation through the material allows the fluid within the enclosed volume to exit at a sufficient rate to have the fluid remaining within the enclosed volume urge the first and second toroidal rings to expand radially against each other and the male member and axially against the ring seal and the shoulder abutting the accumulator ring to axially compress the ring seal for a sufficient amount of time to minimize the explosive decompression effects on the ring seal.

14. A seal assembly for high pressure applications, said assembly comprising:
   a first member having a first surface;
   a second member having a second surface, wherein the first surface and second surface oppose and are spaced from each other when the first and second members are joined;
   a third surface and a fourth surface, wherein each of the third and fourth surfaces is integral to, attached to or supported by one of the first and second surfaces and wherein the third surface and fourth surface oppose and are spaced from each other,
   wherein the first, second, third and fourth surfaces define a seal gland therewithin;
   a ring seal positioned within the seal gland, wherein the ring seal has a non-metallic portion which is axially compressed to sealingly engage the first surface and the second surface in the set position and wherein the non-metallic portion is a major portion of the ring seal and is susceptible to explosive decompression effects; and
   an accumulator ring positioned within the seal gland on the side of the ring seal to be exposed to a high pressure fluid, wherein said accumulator ring has an exterior and an interior, wherein the interior has a void fraction defining an accumulator volume and said accumulator ring has at least one channel providing communication between the exterior of the accumulator ring and the accumulator volume, wherein in an installed position exposed to high pressure fluids, the accumulator volume fills with fluid and during an explosive decompression event, the at least one channel allows the fluid in the accumulator ring to escape at a rate sufficient to allow the exterior to compress the ring seal for a sufficient amount of time to minimize the explosive decompression effects on the non-metallic portion of the ring seal.

15. A seal assembly according to claim 14, wherein the accumulator ring and the ring seal fill the seal gland in an installed position.

16. A seal assembly according to claim 14,
   wherein the third surface is an annular shoulder on the first member, and
   said seal assembly further comprising:
   a seal retainer placed in the seal gland, the seal retainer having a first end and a second end, the first end configured to contact the annular shoulder of the first member and the second end configured to contact the ring seal to compress the ring seal axially.

17. A seal assembly according to claim 14, wherein the accumulator ring is an o-ring provided with at least one vent hole between the exterior and interior of the o-ring.

18. A seal assembly according to claim 14, wherein the accumulator ring is an o-ring that is pressure-energized to engage the ring seal and the shoulder abutting accumulator ring in response to an explosive decompression event in the seal assembly.

19. A seal assembly according to claim 14, wherein the accumulator ring is made of a material permeable by the high pressure fluid, wherein the extent of permeation of the high pressure fluid is the void fraction, and the material releases the permeated fluid therefrom during an explosive decompression event at a slower rate than the ring seal, thereby allowing the accumulator ring to expand and load the ring seal within the seal gland to minimize the explosive decompression effects on the ring seal.

20. A seal assembly according to claim 19, wherein the accumulator ring is also partly hollow providing an additional volume for containing the high pressure fluid that has permeated through the material and increasing the void fraction.

21. A seal assembly according to claim 20, wherein the accumulator ring has a spring within it.

22. A seal assembly according to claim 14, wherein the accumulator ring has at least:
   a first toroidal ring and
   a second toroidal ring,
   wherein each of the first and second toroidal rings has an axial cross section that defines a planar figure,
   the planar figure partially encloses an area having an open side and a closed side, and the open side of the first toroidal ring is placed within the open side of the second toroidal ring with the closed sides of the first and second toroidal rings opposing each other and the thus positioned first and second toroidal rings defining an enclosed volume therewithin and an exterior surface.

23. A seal assembly according to claim 22, wherein the planar figure formed by the axial cross section of the first and second toroidal rings is U-shaped and the first and second toroidal rings each being a U-shaped toroidal ring having an open side and a closed side.

24. A seal assembly according to claim 22, wherein at least one of the first and second toroidal rings has at least one vent to allow high pressure fluid to enter the enclosed volume and the number and size of the at least one vent are such that during an explosive decompression event the at least one vent allows the fluid within the enclosed volume to exit at a sufficient rate to have the fluid remaining within the enclosed volume urge the first and second toroidal rings to expand radially against each other and the first and second surfaces and axially against the ring seal and the fourth surface abutting the accumulator ring to axially compress the ring seal for a sufficient amount of time to minimize the explosive decompression effects on the ring seal.

25. A seal assembly according to claim 22, wherein at least one of the first and second toroidal rings is made of a material that allows high pressure fluid to permeate through the material and enter the enclosed volume and during an explosive decompression event the rate of permeation through the material allows the fluid within the enclosed volume to exit at a sufficient rate to have the fluid remaining within the enclosed volume urge the first and second toroidal rings to expand radially against each other and the first and second surfaces and axially against the ring seal and the fourth surface abutting the accumulator ring to axially compress the ring seal for a sufficient amount of time to minimize the explosive decompression effects on the ring seal.

26. A seal assembly according to claim 14, wherein the accumulator ring has at least:

a toroidal ring, wherein the toroidal ring has an axial cross section that defines a planar figure, the planar figure partially encloses an area having an open side and a closed side, and in an installed position the open side of the toroidal ring is placed adjacent one end of the ring seal and the thus positioned toroidal ring and ring seal defining an enclosed volume therewithin and an exterior surface of the toroidal ring.

27. A seal assembly according to claim 26, wherein the planar figure formed by the axial cross section of the toroidal ring is E-shaped and the toroidal ring being an E-shaped toroidal ring having an open side and a closed side.

28. A seal assembly according to claim 26, wherein the toroidal ring has at least one vent to allow high pressure fluid to enter the enclosed volume and the number and size of the at least one vent are such that during an explosive decompression event the at least one vent allows the fluid within the enclosed volume to exit at a sufficient rate to have the fluid remaining within the enclosed volume urge the toroidal ring to expand radially against the first and second surfaces and axially against the ring seal and the fourth surface abutting the accumulator ring to axially compress the ring seal for a sufficient amount of time to minimize the explosive decompression effects on the ring seal.

29. A seal assembly according to claim 26, wherein the toroidal ring is made of a material that allows high pressure fluid to permeate through the material and enter the enclosed volume and during an explosive decompression event the rate of permeation through the material allows the fluid within the enclosed volume to exit at a sufficient rate to have the fluid remaining within the enclosed volume urge the toroidal ring to expand radially against the first and second surfaces and axially against the ring seal and the fourth surface abutting the accumulator ring to axially compress the ring seal for a sufficient amount of time to minimize the explosive decompression effects on the ring seal.

30. A seal assembly according to claim 14, wherein at least a portion of the accumulator ring is attached to the ring seal.

31. A seal assembly according to claim 14, wherein at least a portion of the accumulator ring is integral to at least a portion of the ring seal.

* * * * *